May 1, 1951 W. B. EWING ET AL 2,550,680
MEANS FOR INTERMITTENTLY FEEDING STOCK
Filed Feb. 24, 1949 2 Sheets-Sheet 1
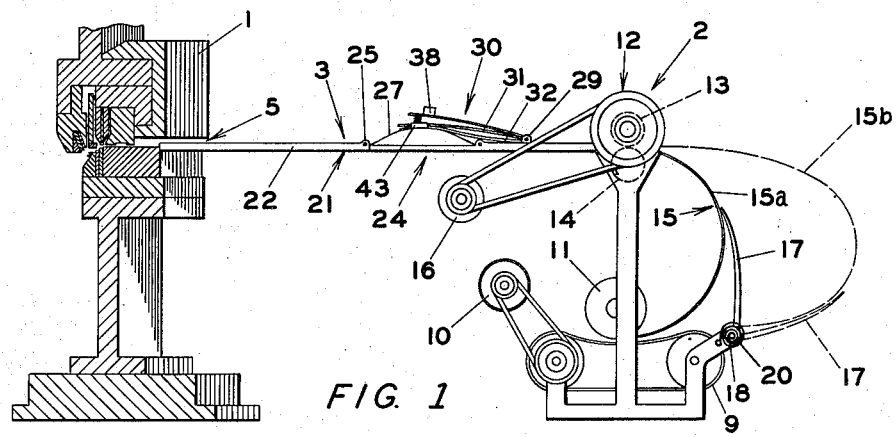
FIG. 1
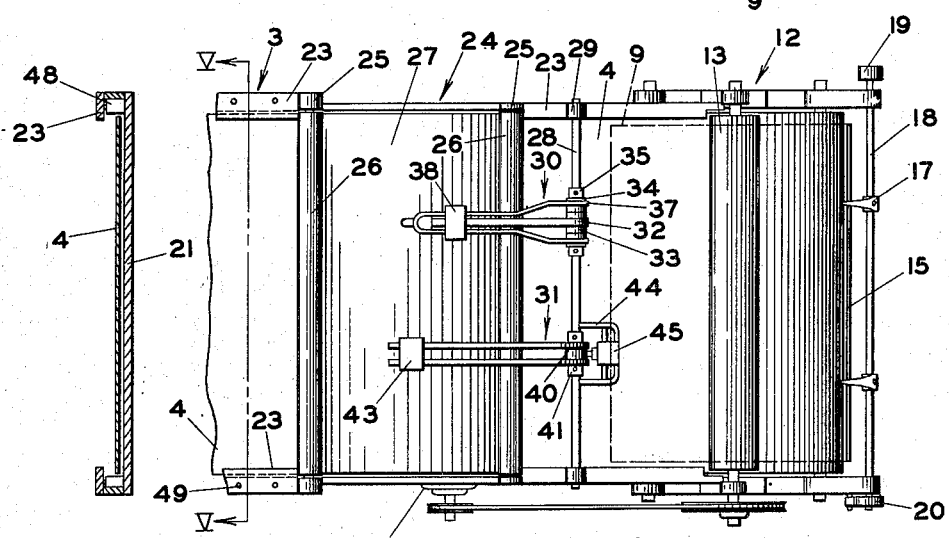
FIG. 5  FIG. 2
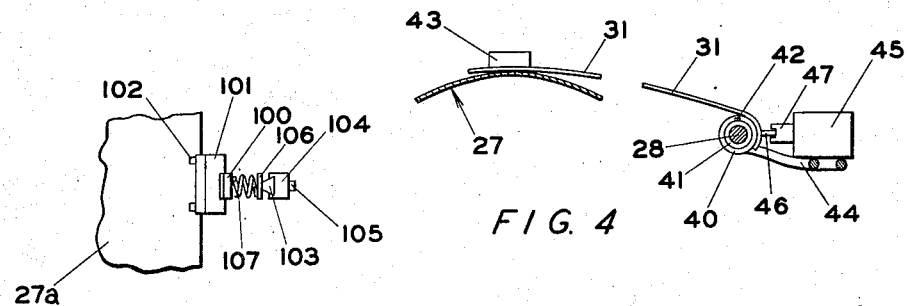
FIG. 9  FIG. 4
Inventor
WALKLEY B. EWING
STUART W. THAYER
By Peter H. Price
Attorney May 1, 1951     W. B. EWING ET AL     2,550,680
MEANS FOR INTERMITTENTLY FEEDING STOCK
Filed Feb. 24, 1949     2 Sheets-Sheet 2

Inventor
WALKLEY B. EWING
STUART W. THAYER
Attorney

Patented May 1, 1951

2,550,680

UNITED STATES PATENT OFFICE 2,550,680

MEANS FOR INTERMITTENTLY FEEDING STOCK

Walkley B. Ewing, Grand Rapids, Mich., and Stuart W. Thayer, Melrose, Mass., assignors to Ewing Development Company, Grand Rapids, Mich., a corporation of Michigan Application February 24, 1949, Serial No. 78,126

4 Claims. (Cl. 271—2.1)

This invention relates to the intermittent feeding of stock to a fabricating machine and more particularly to a feeding mechanism capable of rapidly, accurately and intermittently feeding sheet or strip stock in short segments to a fabricating machine. This device is particularly designed to complete a large number of feeding cycles per second.

Fabricating machines have for many years had a capacity far greater than the ability of existing feeding machines to supply them, particularly where the feeding operation must be both rapid and intermittent. Thus, the capacity of the fabricating machine has been limited by the capacity of the feeding mechanism.

Although the problem of rapidly feeding short lengths of material has existed for many years and many solutions have been proposed for the complex problems involved, each of these solutions has had certain inherent disadvantages. Among these disadvantages has been the fact that feeding machines constructed according to heretofore existing designs are too slow in their operation. Where the feed is intermittent, resulting in a complete cessation in the movement of the stock and the stock impelling mechanism between each feeding operation, the inertia of the feeding or impelling mechanism is of such magnitude that rapid wear results to the machine parts. This is true even under greatly reduced operating speeds. Where rollers are employed to impel the material, it is necessary to make them massive in order to insure an effective frictional contact with the stock and consequently their inertia factor is high. The resulting rapid concentration of stresses imposes excessive strains upon the operating mechanism, wearing out clutches, gears and motors. The same observation is true in the case of the other types of impelling mechanism, such as a clamp moved by a ratchet mechanism.

In addition to the inertia factor of the feeding mechanism, there is the inertia of the stock itself. This is a negligible factor at slow speeds but increases to quite appreciable proportions as the operation is accelerated, even though thin gauge stock is involved. The inertia of the stock results in slippage between the stock and the impelling mechanism causing scoring of the stock surface, especially where smooth surfaced, soft metals, such as aluminum, are involved.

Of greater importance than the factor of wear on the machine parts and damage to the stock is the fact that even under reduced operating speeds the feeding operation is frequently inaccurate. Previously devised mechanisms could not guarantee the identical length of material being fed to the fabricating machine at each feeding cycle. This resulted in inferior products and a large loss in scrap. Particularly is this a problem in the fabrication of a product involving a large number of punching operations on a single sheet whereby any one serious imperfection destroys the value of the entire sheets. So important is this problem of accuracy that it was necessary to reduce the operating speed of the fabricating machine to that at which the feeding mechanism could operate substantially accurately rather than to attempt to obtain the fabricating machine's full capacity. The inertia of both the machine and the stock combined to render an intermittent feeding operation at reduced speeds unsatisfactory and at high speeds impossible.

To overcome these difficulties it was necessary to redesign completely the feeding mechanism and to develop one operating upon an entirely novel principle.

We have accomplished this objective by the construction of a feeding mechanism of extreme simplicity in which a substantial portion of the impelling force for feeding the stock is generated by the inherent resiliency of the stock itself. The remainder of the force necessary to impel the stock is created by a pressure of constant application. Thus, the impelling force is ready for instantaneous operation each time the stock is released for movement. The necessity of activating heavy rollers and clamps is eliminated.

It is, therefore, a primary object of our invention, to provide a stock feeding mechanism utilizing an impelling force generated in part by the stock itself.

It is an additional object of our invention to provide a stock feeding mechanism capable of rapid, successive, intermittent feeding cycles.

It is a further object of our invention to provide a stock feeding mechanism capable of rapidly feeding an accurate length of stock during each feeding cycle.

It is a further additional object of our invention to provide a stock feeding mechanism of simple design and having a capacity for dependable operation throughout a long period of use.

Other objects and purposes of our invention will be immediately seen by persons acquainted with the problems of rapidly feeding fabricating machines upon reading the following specification and the accompanying drawings, in which:

Figure 1 is a side elevation view of our improved stock feeding mechanism showing a fragmentary portion of the fabricating machine in detail.

Figure 2 is a top view of our improved stock feeding mechanism.

Figure 4 is an enlarged view of the arch size control arm of our improved stock feeding mechanism.

Figure 5 is a fragmentary sectional view of the elevated guideway of our improved stock feeding mechanism taken along the plane V—V of Figure 2.

Figure 9 is a fragmentary front elevation view of the modification of our invention shown in Figure 7.

Figure 7:
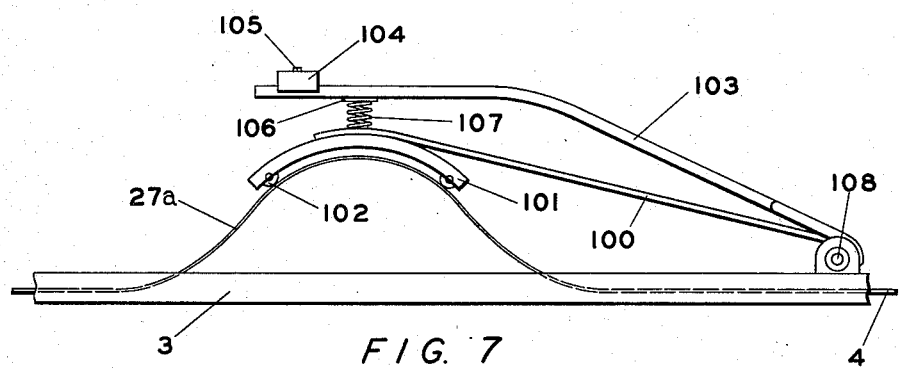
Figure 7 is a side elevation view of a modification of our invention not showing the arch size control arm.

For the purpose of carrying out our invention, it is necessary to use stock having a degree of inherent resiliency and capable of being forced into the shape of an arch without injurious effect. It should be in the form of sheets or thin rods, but cannot be material having a structural shape such that flexion is difficult or impossible. Further, our invention is designed to operate with stock supplied in long continuous sheets rather than short sections.

In executing the objects and purposes of our invention, we have provided an intermittently operated stock uncoiling device of substantially conventional design having cooperating therewith means creating an arch or bubble of stock. Means are provided to apply a constant pressure on the arch of stock urging it to collapse. In addition, we have provided means for controlling the minimum and maximum sizes of the arch.

In the following description the terms "upwardly" and "downwardly" are frequently used and are to be taken as upwardly in the direction as shown in Figure 1 and downwardly away therefrom. The terms "forwardly" and "rearwardly" are also frequently used and are to be taken as forwardly in the direction in which the stock moves, i. e., toward the fabricating machine, and rearwardly away therefrom.

Referring now to the drawings in greater detail, the numeral 1 indicates a frabricating machine operatively associated with a stock unwinding and supplying mechanism 2 by means of an elevated guideway 3. The fabricating machine receives the sheet of stock 4 through the opening 5. Forward motion of the stock 4 is checked by the stop 6 and thereafter prevented, during the operating cycle of the machine, by the clamp 7. The material is then cut and off-set by the die 8 and upon release by the clamp 7 the sheet of stock moves forwardly again until the edge of the uncut stock contacts the stop 6. It is thus seen that the fabricating machine 1 requires a stock feeding mechanism capable of rapid, intermittent feeding of sheet stock in short segments. The exact construction and operation of the fabricating machine are not presented in detail since they are fully described and shown in co-pending application No. 688,302, filed August 3, 1946, entitled Means for Controlling the Advancement of Stock, filed as a continuation-in-part of application No. 488,612, now Patent No. 2,405,198.

The stock supplying mechanism includes a power driven track 9 intermittently operated by a motor 10. The roll of stock 11 rests on the track 9 and unrolls whenever the upper portion of the track 9 is caused to move rearwardly. Substantially above the roll of stock 11 are a pair of horizontally positioned rolls 12 including a driver 13 and an idler 14. A motor 16 provides power for intermittent operation of the driver 13. The stock 4 passes through a loop 15 between the roll of stock 11 and the rolls 12. The stock 4 passes between the driver 13 and the idler 14 with sufficient frictional bearing with the driver 13 that rotation of the driver will cause the stock 4 to move forwardly. The loop 15 varies in size between the minimum loop 15a and the maximum loop 15b.

A pair of followers 17, rigidly mounted to the rod 18 rotate the rod 18 as the size of the loop 15 varies between its maximum and minimum limits. A limit switch 19, controlling the power circuit for the motor 10, is operatively attached to one end of the rod 18 and operates in response to the rotation of the rod. A coil spring 20 mounted on one end of the rod 18 forces the followers 17 upwardly against the loop of stock 15.

Forwardly of the rolls 12 the stock 4 enters the elevated guideway 3 which consists of a flat bed 21 and side rails 22. The side rails 22 at their upper ends are each equipped with a flange 23 directed toward the center of the elevated guideway 3 and extending over the edge portions of the stock 4. If it is so desired, the flanges 23 may be eliminated and the entire width of the top of the guideway 3 covered by a sheet. At a point between the fabricating machine 1 and the rolls 12 a bubble area 24 is provided by elimination of the flanges 23 for a substantial distance longitudinally of the elevated guideway 3, leaving the stock 4 free to arch upwardly. This bubble area 24 is shown as substantially midway between the fabricating machine 1 and the rolls 12, although it may be placed anywhere along the elevated guideway 3. Preferably, however, it is placed adjacent the fabricating machine 1, to reduce the amount of frictional drag on the stock 4 between the bubble area 24 and the fabricating machine 1. A pair of upwardly standing ears 25 are provided at each end of the bubble area 24 on which are mounted, transversely of the elevated guideway 3, a pair of free rollers 26, one on the forward end and one on the rearward end of the bubble area 24. For reasons more fully explained hereinafter, the stock 4 is caused to develop an arch or bubble 27 between the free rollers 26.

Substantially rearwardly of the bubble area 24 a rod 28 is rigidly mounted transversely to the elevated guideway 3 by means of the studs 29. Pivotally mounted on the rod 28 are the stock impelling arm 30 and the arch size control lever 31.

The stock impelling arm 30 includes a shoe 32 and a bifurcated member 37. The shoe 32 is contoured on its free end to substantially fit the arch 27 and is mounted on its other end to a bearing 33 rotatably supported on the rod 28. On each side of the bearing 33 is a bearing 34 rotatably mounted on the rod 28. The bearings 33 and 34 are held against movement axially of the rod 28 by the collars 35 which, in turn, are secured to the rod 28 by the set screws 36. The bifurcated member 37 is mounted on the rod 28 by means of the bearings 34 and, similarly to the shoe member 32, is freely rotatable about the rod 28. Adjacent its free end, the bifurcated member 37 supports a pressure member or weight 38. The pressure member 38 may vary in size according to the gauge and material of the stock 4, being of increasing weight as the gauge of the stock 4 is increased. As an example, when the stock 4 is .016 gauge aluminum sheet, a satisfactory weight for the pressure member 38 has been found to be approximately five pounds. This weight, however, will vary, even for the same stock, according to the amount of friction generated by the elevated guideway 3 between the bubble area 24 and the fabricating machine 1. To overcome the necessity of maintaining a number of pressure members 38, each of a different size, the pressure member 38 is designed to be movable longitudinally of the bifurcated member 37. To accomplish this the pressure member 38 is mounted on the bifurcated member 37 by means of a plate 50 and bolt 51. When the bolt 51 is loosened the pressure member 38 may be moved along the bifurcated member 37.

Between the bifurcated member 37 and the shoe member 32 a coil spring 39 is imposed and provides the only operative contact between the two parts. The spring 39 is shown as positioned between the pressure member 38 and the end of the bifurcated member 37 and is preferably positioned directly above the crown or apex of the arch 27. The pressure member 38 may be located in vertical alignment with the spring 39 or somewhat forwardly or rearwardly of it, depending upon the amount of downward pressure required.

The control lever 31 is mounted to the rod 28 for free rotation thereon by means of the bearing 40 and is held against axial displacement on the rod 28 by the collars 41 and set screws 42. The free end of the control lever 31 rests upon the arch 27 and is equipped with a weight 43. The weight 43 is only of sufficient size to insure substantially constant contact between the control lever 31 and the arch 27.

A bracket 44 rigidly mounted to the rod 28 supports a limit switch 45 rearwardly of the control lever 31. The limit switch 45 controls the electrical circuit energizing the motor 16. By means of the toggle formed by the interaction of the peg 46 on the bearing 40 and the lever 47 on the limit switch 45, the limit switch is caused to open the electrical circuit when the arch 27 reaches a predetermined maximum size and to close it again when the arch 27 reaches a certain minimum size.

The guideway 3 is equipped with vertically positioned guide rollers 48 on each side of the stock 4 between the bubble area 24 and the fabricating machine 1. Guide rollers may be employed rearwardly of the bubble area 24, but their use in this portion of the guideway 3 is not as important as their use between the bubble area 24 and the fabricating machine 1. The guide rollers 48 are mounted by means of shafts 49 extending through the flat bed 21 on one end and through the flange 23 on the other end.

Operation

A sufficient length of stock 4 is uncoiled from the roll of stock 11 to permit the stock to be fed through the rolls 12. Thereafter the motors 10 and 16 are both operated. The rolls 12 will cause the stock to advance forwardly along the guideway 3 and into the fabricating machine 1 until further forward movement of the end of the stock 4 is prevented by the stop 6. The rolls 12 will continue to feed additional stock 4 into the guideway 3 causing an arch 27 to be formed in the bubble area 24. As the arch 27 increases in size the control lever 31 will be lifted upwardly until the limit switch 45 is actuated to open the circuit controlling the motor 16, thereby stopping the rolls 12.

The powered track 9 will continue to unwind the roll of stock 11, after the rolls 12 have ceased to operate, until the loop 15 expands to the size of the loop 15b. When the loop 15b has been created the followers 17 will actuate the limit switch 19 to open the circuit controlling the motor 10.

Operation of the fabricating machine 1 will allow a number of short lengths of stock to successively escape from the arch 27.

The particular fabricating machine 1, illustratively shown here as used in cooperation with the stock feeding mechanism comprising the invention, may be operated up to a speed of approximately 300 strokes per minute. At each stroke it requires an additional .150 inch length of new stock, each of which lengths must be fed to the fabricating machine within a period of about $1/25$ of a second. Further, the variation in size between each length of stock must not exceed .001 inch. The major problem of feeding stock at this speed involves the necessity of overcoming the inertia of both the feeding machinery and the stock. Our invention accomplishes both. The creation of the arch 27 provides, by means of the natural resiliency of the stock 4, a constant urging of the stock 4 toward the fabricating machine 1. This pressure is applied to the stock while in motion and while stationary. The arch 27 alone, however, does not generate the required force to overcome the inertia of the stock 4 and impel the stock with sufficient rapidity each time it is released by the clamp 7. Therefore, the pressure member 38 is used to bear down on the arch 27 and increase the magnitude of the force with which the stock is urged toward the fabricating machine. Since the speed at which the pressure member 38 will overcome its inertia and impose its weight upon the arch 27 is dependent upon the rate of acceleration of a free falling body, it is seen that the movement of the weight is too slow to be effective when the entire movement of the stock must be accomplished within $1/25$ of a second. Therefore, provision must be made to apply the downward force to the arch 27 during this interval when the movement of the pressure member 38 lags behind the necessary movement of the stock 4. The need for application of a downward force to the crown of the arch 27 is most critically needed at the initiation of the movement of the stock 4. This is when the pressure member 38 is least effective because its rate of acceleration is substantially zero.

This lapse is overcome by use of the coil spring 39 interposed between the pressure member 38 and the shoe 32. The resiliency of the spring 39 acts to apply constantly the force of the pressure member 38 to the bubble or arch 27 irrespective of the rapidity of the individual movements of the arch 27. Since the spring 39 acts instantaneously upon release of the back pressure supporting the arch 27, it applies the force of the pressure member 38 during the interval between the time the clamp 7 releases the stock 4 and the time when inertia of the pressure member 38 is overcome. The spring 39 applies the downward pressure on the arch 27 while the latter is in motion, and the relatively inert pressure member 38 catches up with the spring 39 during the interval when the arch 27 is stationary.

As the fabricating machine 1 permits escapement of the stock 4 from the arch 27, the arch decreases in size until the control lever 31 trips the limit switch 45 to actuate the motor 16. Since the rolls 12 are set to feed stock to the arch 27 faster than the fabricating machine 1 permits it to escape, the arch will increase in size until the motor 16 is stopped.

The imposition of the feed regulating mechanism between the rolls 12 and the fabricating machine 1 permits the rolls to be operated at much slower speed than would be possible by intermittent rotation of the rolls 12 to feed the fabricating machine 1 directly. Further, each operation of the rolls 12 moves a sufficient length of stock 4 to supply the fabricating machine for a large number of operating cycles. These factors combine to prevent slippage between the rolls 12 and the stock 4 and to reduce wear upon the rolls 12 and their operating mechanism. The structure and design of our feed regulating mechanism is such that the factor of wear and slippage is minor by comparison with that experienced in previously existing designs.

The free rollers 26 provide a friction reducing means for receiving the stock 4 into the arch 27 and delivering it from the arch 27 to the guideway 3. They also insure the existence of a radius at each end of the arch 27 for preventing creasing of the stock 4. The guide rollers 48 reduce friction between the guideway 3 and the stock 4 to facilitate the rapid operation of the feeding mechanism.

It is thus seen that our invention is capable of feeding sheet or strip stock in short, accurate segments to a fabricating machine at high speeds. It accomplishes this by continuously maintaining a force of substantially constant magnitude on the stock for impelling it toward the fabricating machine, even though the interval between each operation of the feeding mechanism is so short that the stock is substantially constantly in motion. At the same time, it automatically controls the supply of stock to the feeding mechanism.

Figure 8:
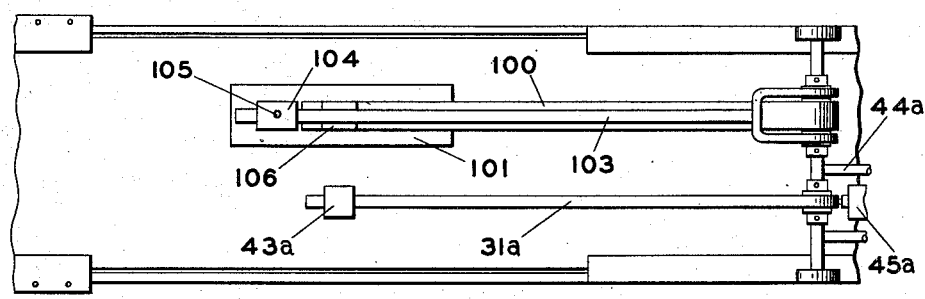
Figure 8 is a top view of the modification of our invention shown in Figure 7.

The mechanism for urging the arch 27 to collapse may be modified as shown in Figures 7, 8 and 9. In the structure shown in these figures the free end of the shoe 100 is supported on a truck 101 curved longitudinally of the stock 4 to seat over the crown of the arch 27a. Rollers 102 on each end of the truck 101 engage the surface of the arch 27a. The truck 101 is so attached to the shoe 100 that it is held against movement transversely or laterally of the shoe 100 but is capable of tilting longitudinally of the shoe 100 in order to assure constant contact with the arch 27a as the arch varies in size. The truck 101 is so constructed that the rollers 102 contact the arch 27a a substantial distance each side of the arch's centerline and thereby control the shape of the arch and the position of its centerline longitudinally of the elevated guideway. No other guides are necessary to define the arch 27a; therefore, the free rollers 26 (Fig. 2) may be eliminated.

Above the shoe 100 and parallel to it is the rod 103 having an isosceles trapezoidal cross section. A pressure member or weight 104 is movably mounted on the rod 103. A set screw 105 is used to lock the pressure member 104 in any desired position on the rod 103. A plate 106 is mounted to the lower surface of the rod 103 adjacent the rod's free or forward end. A coil spring 107 mounted to the plate 106 supports the free end of the rod 103 upon the shoe 100 and truck 101.

Figure 3:
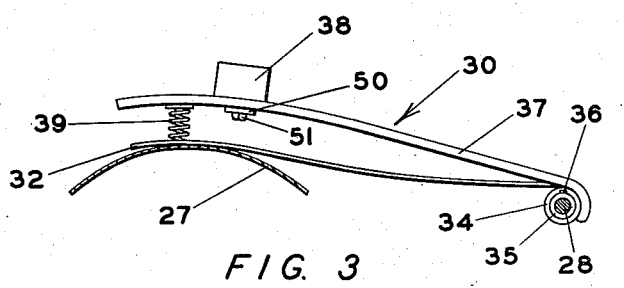
Figure 3 is an enlarged side elevation view of the stock impelling arm of our improved stock feeding machine.
Figure 6:
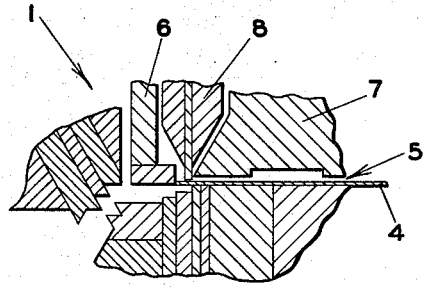
Figure 6 is an enlarged fragmentary sectional view of the fabricating machine shown in Figure 1 in the region of the punch.

The rearward ends of the rod 103 and the shoe 100 are pivotally mounted on the shaft 108. The design and construction of the shaft 108 and of the means by which the rod 103 and shoe 100 are mounted to it are identical to the corresponding structure shown in Figures 2 and 3 and, therefore, are not repeated here. The size of the arch 27a is controlled by the arch size control arm 31a having a weight 43a on its free or forward end and pivoted to the shaft 108 at its rearward end. A limit switch 45a mounted on a bracket 44a is actuated by the arm 31a. The operation of the arm 31a and the limit switch 45a is identical to the arm 31 and limit switch 45 shown in Figures 1, 2 and 4.

The particular design for the stock feeding mechanism, as described, may easily be modified in other ways. The control lever 31 may be eliminated and the limit switch 45 actuated directly by the stock impelling arm 30. It is also possible to replace the pressure member 38 with a spring forcing the stock impelling arm 30 or the truck 101 down against the arch 27. This arrangement will not, however, produce quite as satisfactory results as are obtained with the pressure member 38, unless the size of the arch 27 is maintained within narrow limits. Fluctuations in the size of the arch 27 within the wide ranges possible when a weight is used would, in the case of a spring, produce undesirable variations in the magnitude of the pressure applied to the arch because of the wide difference in the degree of compression imposed upon the spring.

These and other modifications may be made without departing from the spirit of our invention and it is to be understood that all such modifications are to be included within the hereinafter appended claims except where the claims by their terms expressly provide otherwise.

We claim:

1. In means for intermittently feeding short segments of resilient, flexible stock, including a guideway, means for impelling stock along said guideway, means spaced from said stock impelling means for alternately holding and releasing said stock and stock restricting means between said stock impelling means and said stock holding means defining an opening through which said stock may escape from said guideway to form an arch of said stock in said opening, the improvement therein comprising: a truck; friction reducing members on said truck contacting said arch adjacent to and on each side of the crown of said arch and urging said arch to collapse; means for restraining said truck against movement longitudinally of said stock; a resilient member mounted on said truck; a pressure member supported by said resilient member whereby upon release of said stock at said one end, said truck, resilient member and pressure member will urge said stock out of said arch and toward the released end of said stock.

2. In means for intermittently feeding short segments of resilient, flexible stock, the improvement therein comprising: a guideway; means at one of the ends of said guideway for impelling said stock along said guideway; means at the other of the ends of said guideway for alternately holding and releasing said stock; means associated with said guideway for preventing said stock from escaping therefrom and including a pair of guide members between which said stock may escape upwardly from said guideway to form an upwardly directed arch of said stock between said guide members; means resting upon said arch and held against movement longitudinally of said stock, said means substantially spaced from each of said guide members; an arm of substantial length pivotally mounted at one of its ends and having the other of its ends spaced from and above said means resting upon said arch; a spring mounted between said means resting upon said arch and said arm; a weight mounted on said arm adjacent said spring, whereby the downward pressure of said weight is transmitted to said means resting upon said arch and to said arch by said spring for urging said arch to collapse and said stock out of said arch when said one end of said stock is released.

3. In means for intermittently feeding short segments of resilient, flexible stock, the improvement therein comprising: a guideway; means at one of the ends of said guideway for impelling said stock along said guideway; means at the other of the ends of said guideway for alternately holding and releasing said stock; means associated with said guideway for preventing said stock from escaping therefrom and including a pair of guide members between which said stock may escape upwardly from said guideway to form an upwardly directed arch of said stock between said guide members; a shoe of substantial length pivotally mounted at one of its ends and having the other of its ends supported on the crown of said arch; an arm of substantial length pivotally mounted at one of its ends and having the other of its ends spaced from and above the end of said shoe supported on said arch; a spring mounted between said shoe and said arm above the crown of said arch; a weight mounted on said arm adjacent said spring, whereby the downward pressure of said weight is transmitted to said shoe and said arch by said spring for urging said arch to collapse and said stock out of said arch when said one end of said stock is released.

4. In means for intermittently feeding short segments of resilient, flexible stock as described in claim 3 wherein said weight is detachably mounted on said arm for movement longitudinally of said arm.

WALKLEY B. EWING.
STUART W. THAYER.

REFERENCES CITED

The following references are of record in the file of this patent:

UNITED STATES PATENTS

| Number | Name | Date |
|---|---|---|
| 1,339,315 | Bevan et al. | May 4, 1920 |
| 1,549,266 | Kendig | Aug. 11, 1925 |
| 1,642,422 | Manofsky | Sept. 13, 1927 |
| 2,227,387 | Borton | Dec. 31, 1940 |
| 2,436,192 | Braun | Feb. 17, 1948 |